July 19, 1938.  W. B. STOUT  2,124,088
ENGINE MOUNTING
Filed Feb. 3, 1936  6 Sheets-Sheet 1

INVENTOR
William B. Stout.
BY
Harness, Dickey Pierce & Hann
ATTORNEYS.

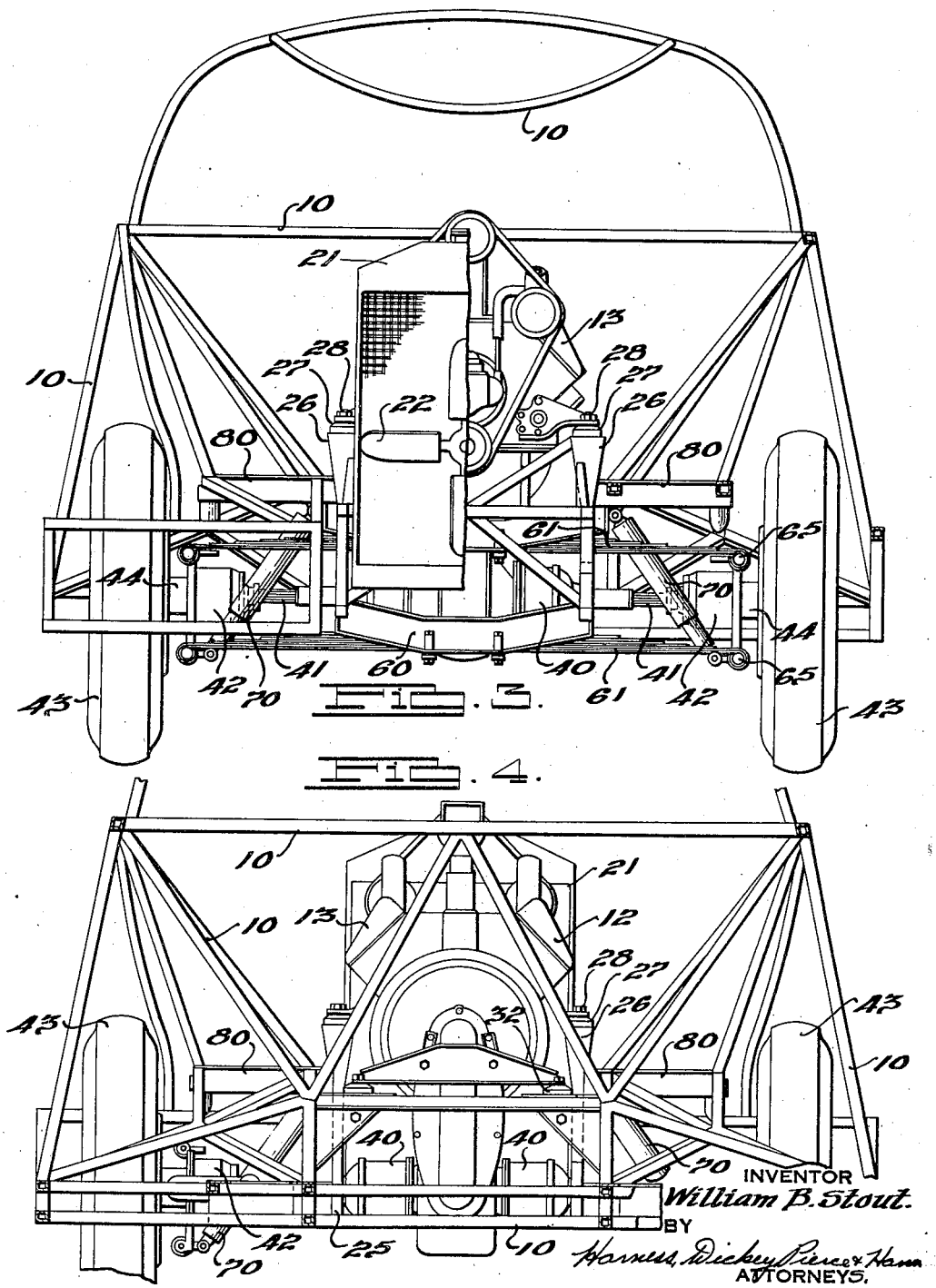

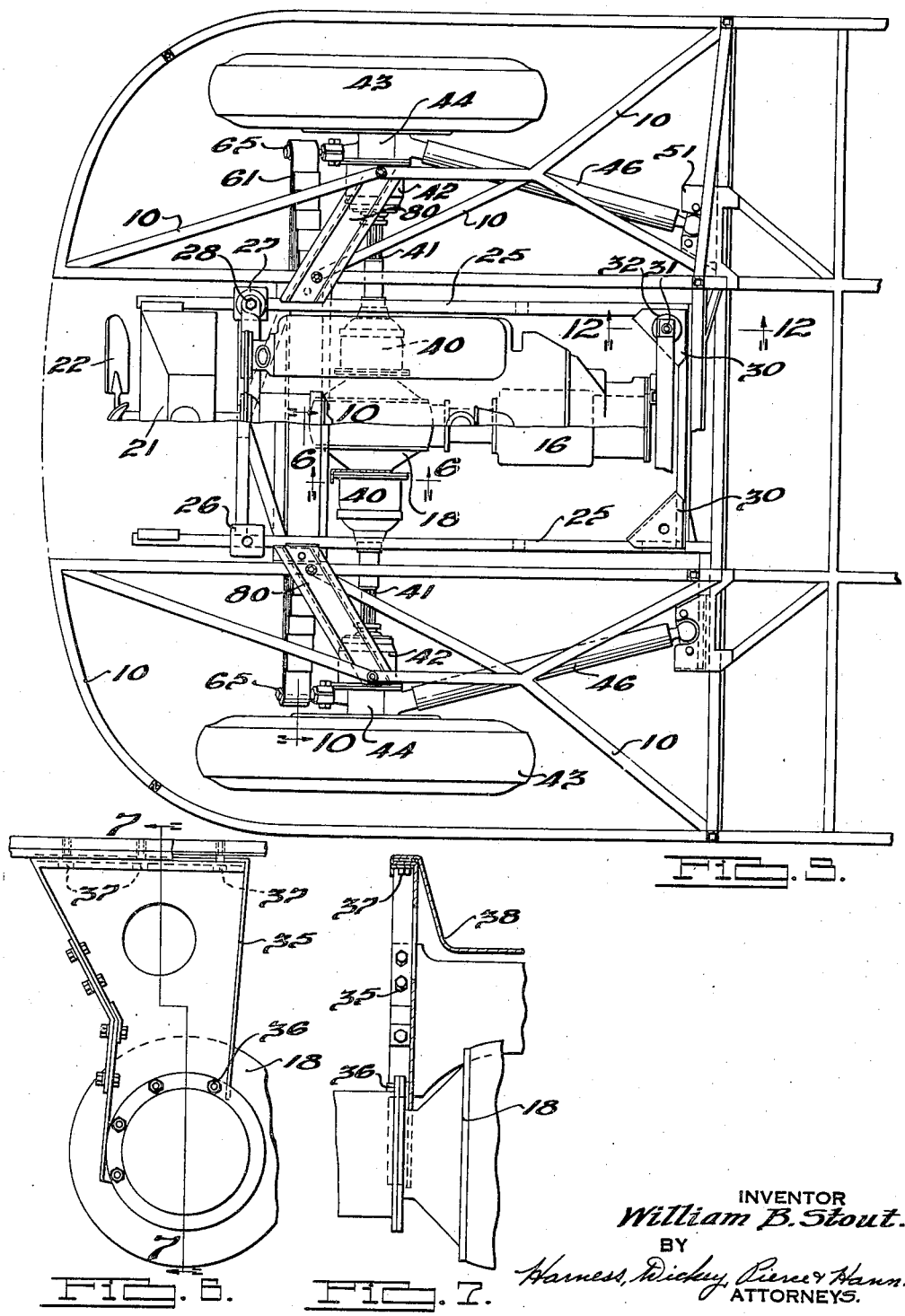

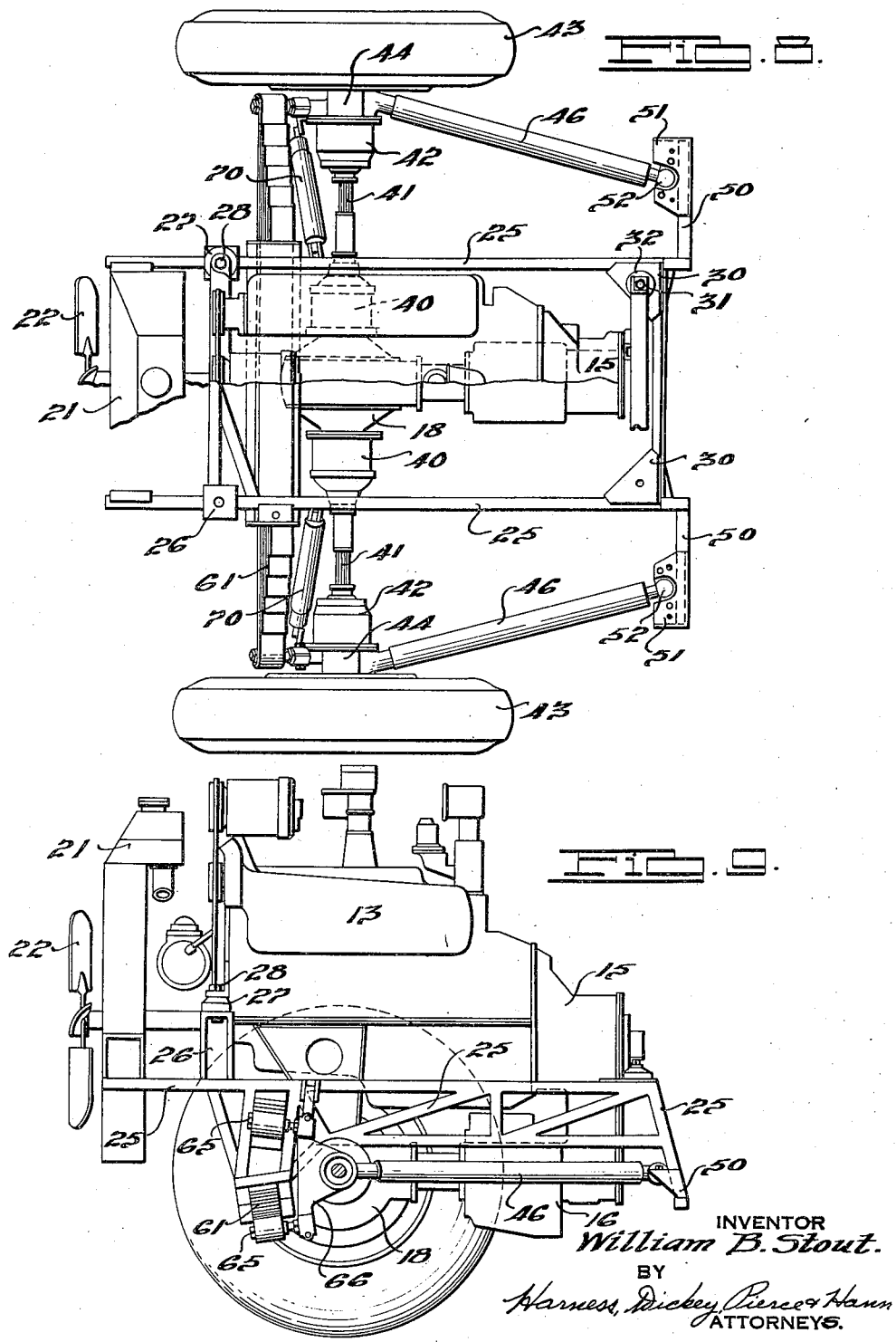

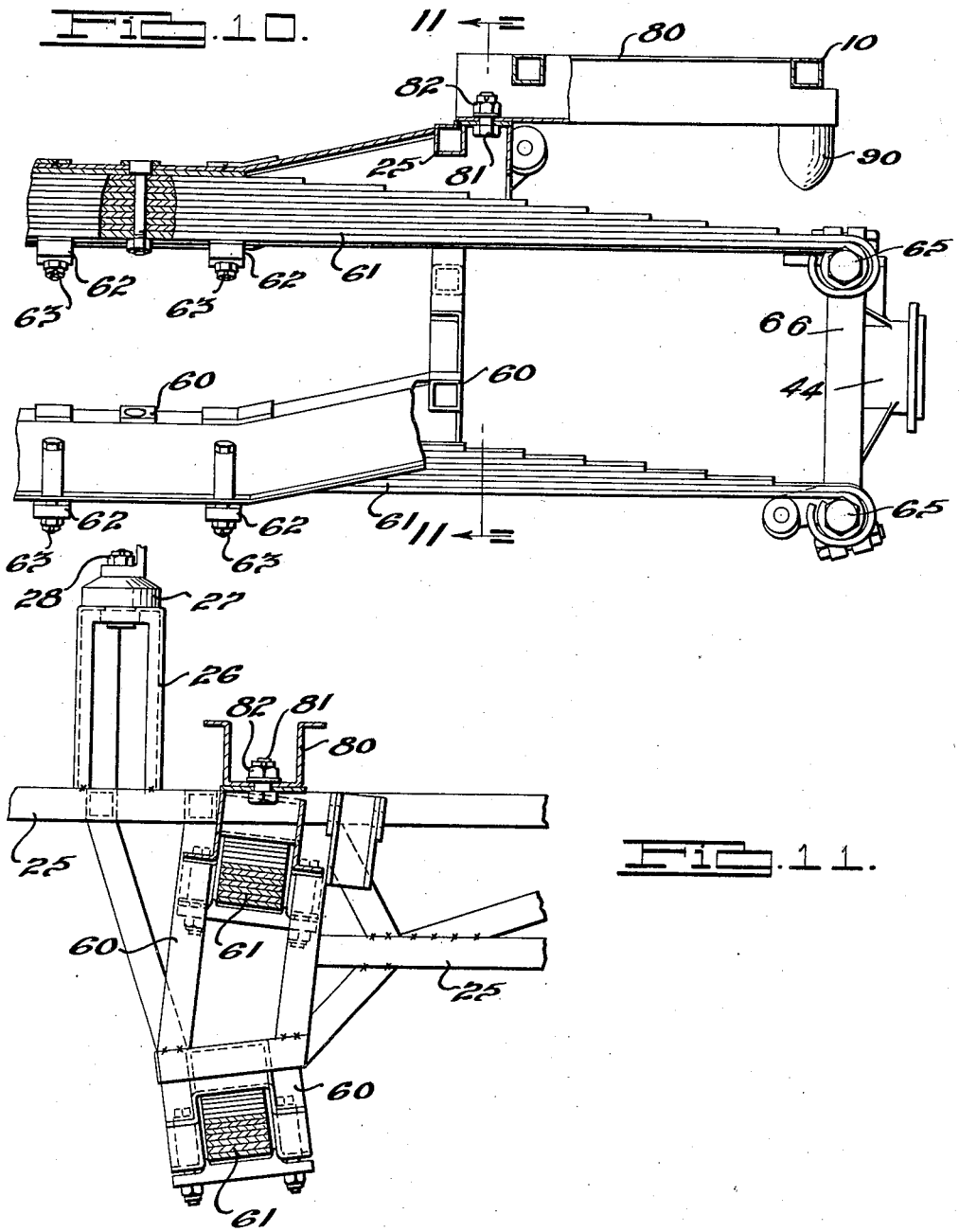

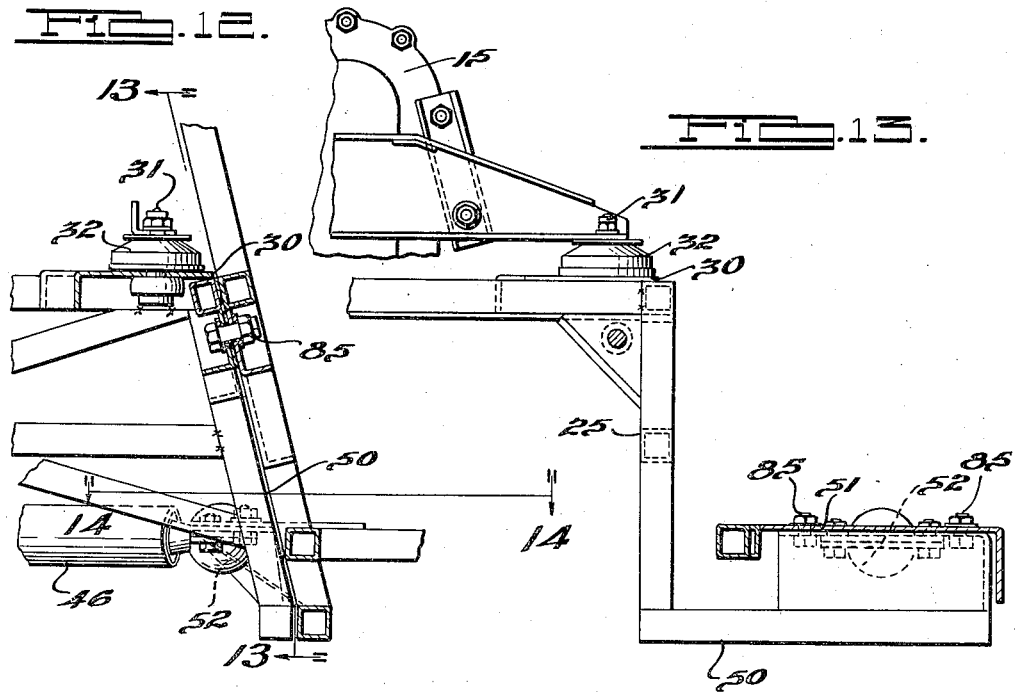
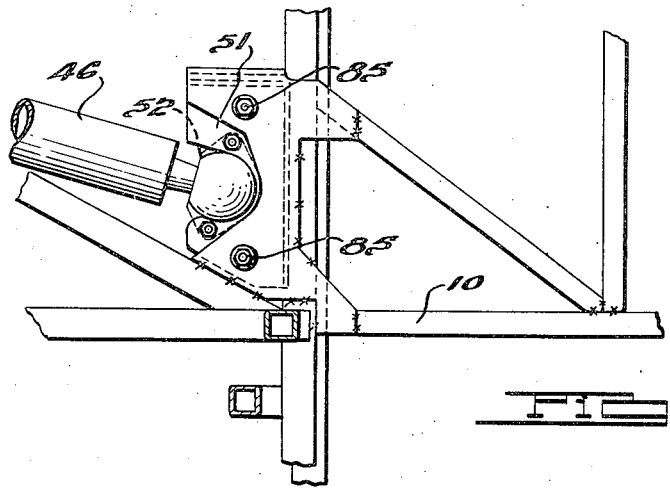

Patented July 19, 1938

2,124,088

UNITED STATES PATENT OFFICE 2,124,088

ENGINE MOUNTING

William B. Stout, Detroit, Mich., assignor, by mesne assignments, to Stout Motor Car Corporation, Dearborn, Mich., a corporation of Delaware Application February 3, 1936, Serial No. 62,058

5 Claims. (Cl. 180—54)

This invention relates to automobile body constructions. More particularly, it relates to an automobile body construction in which a unitary drive assembly is removably mounted in the rear end thereof.

It is a general object of the present invention to provide a rear engine automobile construction in which the engine, transmission and entire drive mechanism are mounted on a unit framework and means are provided for easily demountably assembling the unit drive mechanism with respect to the automobile body.

Another object of the present invention consists in the provision of novel and particularly effective means for resiliently mounting the motor with respect to the wheels which it serves to drive. The present invention contemplates the provision of a novel spring suspension comprising a pair of superimposed transverse leaf springs which interconnect the motor unit and driving wheels and which spring members are inclined to each other in order to produce a maximum springing efficiency during normal operation.

Still a further object of the present invention consists in the novel means by which the rear axle housing is pivotally interconnected to the framework of the body in order that the driving force exerted by the wheels will be transmitted to the body, the while maintaining the wheels accurately positioned with respect to the body which they serve to drive.

Still further, the present invention contemplates the provision of a rear engine automobile having a complete drive mechanism housed within the rear end thereof and novel and particularly effective means for securing the drive unit in position in order that the driving unit as a whole may be readily disconnected from the body.

Still further, the present invention contemplates the provision of a novel radius rod construction for interconnecting the driving axle with the body of the vehicle which it serves to drive and of spring means for interconnecting the axle with the framework supporting the motor and with the motor which serves to drive the wheels. The present invention contemplates the provision of spring means which are accurately positioned with respect to the pivotal point of the radius rods in order that the spring means may operate at maximum efficiency at all times and during all degrees of flexure.

Many other and further objects and advantages of the present invention will become clearly apparent from the following specification when considered in connection with the accompanying drawings forming a part thereof.

In the drawings:

Fig. 3 is a rear elevational view, with portions broken away, showing the mounting of the rear engine driving unit within the body framework;

Fig. 4 is a transverse, sectional view, taken substantially on the line 4—4 of Fig. 2, looking rearwardly, showing the framework to which the motor unit is interconnected and the manner in which the unit is connected thereto;

Fig. 5 is a top plan view of the rear portion of the vehicle body, with portions broken away, showing the motor unit mounted therein and the manner in which the motor is secured into its frame and the manner in which the motor framework is secured to the body;

Fig. 6 is a transverse, sectional view, taken substantially on the line 6—6 of Fig. 5, illustrating in detail the manner in which the differential housing is connected to the motor framework;

Fig. 7 is a fragmentary, sectional view, taken substantially on the line 7—7 of Fig. 6, illustrating in detail the manner in which the differential housing is supported with respect to the motor framework;

Fig. 8 is a top plan view of the driving unit, with portions broken away, showing the manner in which the wheels are accurately positioned with respect to the framework in which the motor is mounted;

Fig. 9 is a side elevational view, with one of the rear wheels removed, showing the removably mounted motor unit and the manner in which this unit is connected to the wheels of the vehicle;

Fig. 10 is an enlarged, fragmentary, sectional view, taken substantially on the line 10—10 of Fig. 5, showing the construction and arrangement of the transverse spring members which serve to support the motor unit upon the driving axle, and the manner in which this motor unit is interconnected with the wheels;

Fig. 11 is a fragmentary, sectional view, taken substantially on the line 11—11 of Fig. 10, illustrating in detail the manner in which the transverse spring members are inclined to the vertical in order that they may operate in planes tangential to the arc described by the radius rods;

Fig. 12 is a fragmentary, sectional view, taken substantially on the line 12—12 of Fig. 5, illustrating in detail the manner in which the motor framework is secured to the body framework;

Fig. 13 is a fragmentary, sectional view, taken substantially on the line 13—13 of Fig. 12, illustrating in detail the manner in which the motor framework is secured to the body framework, and also the manner in which the forward end of the motor is mounted upon the motor framework;

Fig. 14 is a fragmentary, sectional view, taken substantially on the line 14—14 of Fig. 12, illustrating in plan the manner in which the forward ends of the radius rods are removably secured to the body framework.

Figure 1:
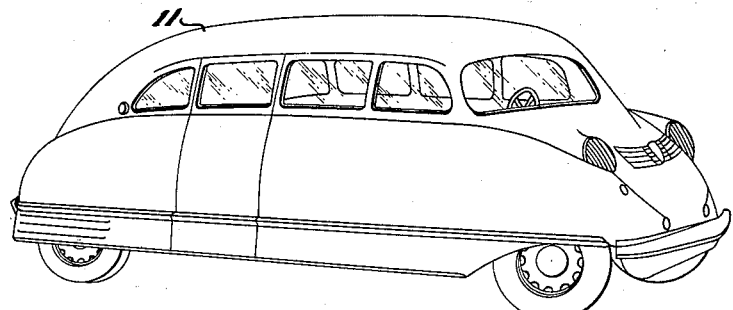
Figure 1 is a perspective view of an automobile of the type particularly adapted for utilization of applicant's improved rear engine unit construction.
Figure 2:
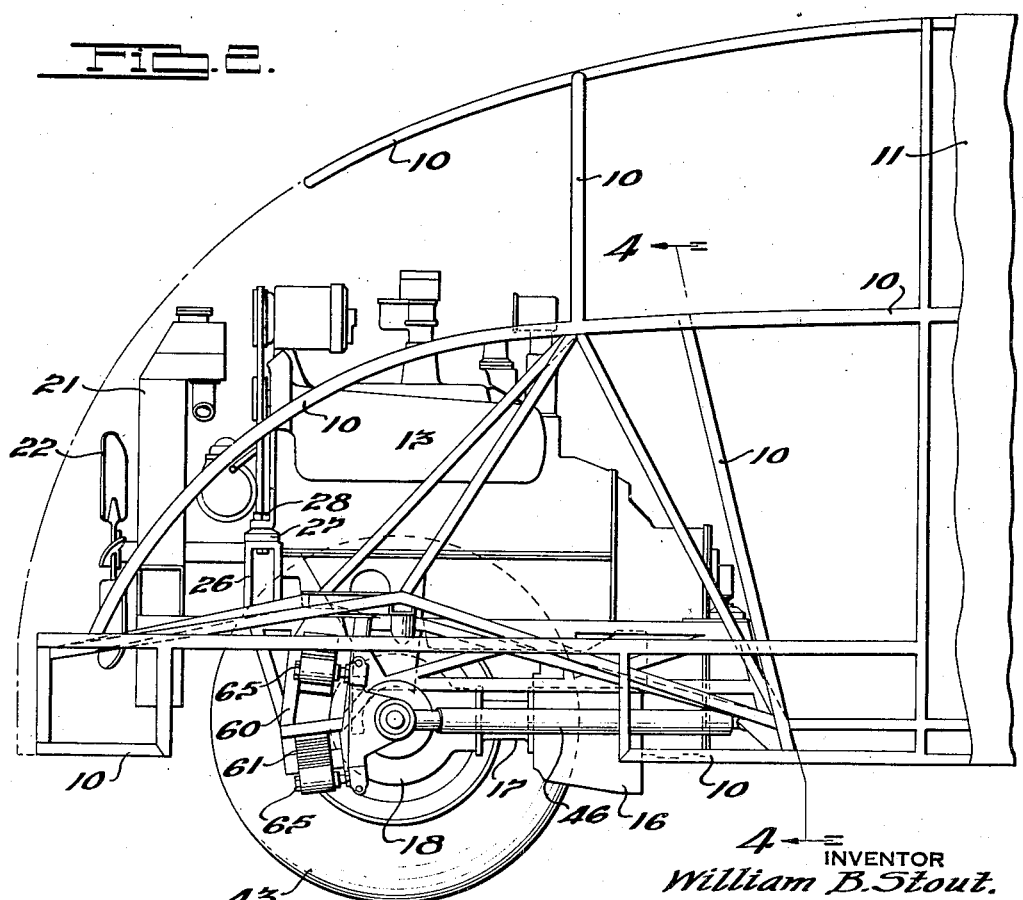
Fig. 2 is an enlarged, side elevational view, with portions broken away, showing the rear engine unit mounted in the body framework.

With more particular reference to the drawings, the specific embodiment of the invention disclosed therein generally comprises a body unit, which in the present disclosure preferably consists of a trusslike framework formed of a plurality of tubular steel members 10 or other suitable structural members welded together to constitute not only the body framework but the chassis of the vehicle. It will be appreciated from the following description that the particular type of removably mounted motor and driving unit, which forms the subject matter of the present application, may be utilized with many and various body constructions and that the specific type of body construction shown and described herein is merely illustrative of one form which is particularly adaptable for utilization with a removably mounted driving unit such as is disclosed in the present application.

The framework 10 is preferably formed generally open at the rear end of the body and has portions which extend completely to the rear end of the automobile at the lateral sides thereof in order to form a recess, in which the motor and driving unit hereinafter described in detail may be inserted from the rear. As is conventional in constructions of this general type, the framework comprising the body and chassis of the vehicle may be covered with a suitable steel sheathing or skin 11 directly welded or otherwise secured to the framework, which sheathing not only constitutes a finish surface but greatly strengthens the framework and results in a considerably more rigid body construction than would otherwise be obtainable.

While the specific form of motor utilized in connection with the present invention is more or less unimportant, I have illustrated by way of example a conventional V-type motor comprising a pair of banks of cylinders 12 and 13, which serve to drive a substantially longitudinally disposed crankshaft. A suitable gearing housing 15 is permanently secured to the forward end of the motor and encloses suitable gears which serve to transmit the drive therefrom to a transmission mechanism 16 located generally underneath the motor, which transmission mechanism by means of a suitable enclosing housing 17 is directly connected to a conventional differential 18 located under the longitudinal central portion of the motor.

As is conventional in constructions of this general type, the motor may have mounted thereon a suitable radiator 21, through which air is circulated by means of a fan 22 driven by the motor in the conventional manner.

The motor unit as a whole is supported in a suitable cradle or framework 25 comprising a plurality of steel tubular members welded together to provide a strong, trusslike supporting structure which is of generally rectangular form and has side portions adapted to extend along the lateral sides of the motor. Permanently secured to the rearward portions of the framework are upstanding pillars 26 which carry at their upper ends suitable rubber blocks or cushions 27 which serve to provide a resilient support for the motor in the framework at the rear end thereof. As is conventional in constructions of this general type, the motor as a whole may be secured to these pillars by means of suitable bolts 28.

The forward end of the motor is similarly supported on the framework upon a pair of gusset plates 30 at substantially the forward corners of the framework and may be similarly secured by means of bolts 31 passing through suitable annular resilient cushioning elements 32.

As is best seen in Figs. 6 and 7, the differential housing 18 is permanently and rigidly secured with respect to the under-side of the motor by means of a suitable pair of brackets 35 which may be bolted directly to the differential housing by means of an arcuate series of bolts 36 and which may be bolted at their upper ends of the under-side of the motor by means of a series of bolts 37 which may also serve to hold the crank case pan 38 to the under-side of the crank case housing. It will readily be appreciated that the specific manner by which the differential is connected to the under-side of the motor is more or less immaterial as far as the present invention is concerned; however, it is preferable in constructions of this general type that the motor, transmission mechanism and differential be substantially a single rigid unit. It will therefore be appreciated that the necessity of universal joints and other flexible drive connections between the motor and the differential is completely eliminated.

As is conventional in constructions of this general type, the differential is provided at each of the lateral sides thereof with universal joints 40 which serve to drive axles 41, which axles are each connected at their outer ends to a second universal joint 42, the drive from which in turn serves to drive wheels 43. The stub axles which interconnect the wheels 43 with the universal joint 42 are journaled within suitable axle housings 44 to which are rigidly connected the rear ends of forwardly extending radius rods 46. These radius rods 46 normally lie in substantially a horizontal plane and extend not only forwardly but inwardly and generally tend to converge in order to absorb a maximum amount of thrust from the driving wheels and transmit this thrust directly to the vehicle body, as will hereinafter be more clearly seen.

The framework 25 which serves to support the motor has at its forward end thereof, laterally extending, integrally formed wing portions 50, which carry sockets 51 adapted to receive balls 52 formed integrally on the forward ends of the radius rods 46. The sockets 51 are preferably formed separable in order that when bolted together they will firmly engage the ball on the forward end of the radius rod and permit a pivotal movement of the radius rod with respect to the socket in which it is mounted.

From the construction described above, it will be apparent that the wheels may move in an arcuate path about this ball joint 52, as a center, and are each free to move not only independently of the other, but independently of the motor unit. This construction is considered particularly important inasmuch as it provides a driven wheel mounting which is extremely flexible and it will be appreciated that due to the relatively great length of the radius rod, a limited amount of arcuate movement of the wheels 43 will be to all intents and purposes vertical.

At the rear end of the framework 25, which serves to mount the motor, an auxiliary depending framework 60 is provided which serves to mount the central portions of a pair of superimposed transversely extending leaf springs 61. The central portions of the springs 61 may be retained in this framework by means of suitable clamping brackets 62, secured in position by means of bolts 63. The outer ends of each of these spring members 61 are secured pivotally upon pins 65, which may be carried by a suitable bracket 66 which may be formed as an integral part of or directly secured to the outer axle housings 44. It will be noted that the pins 65 upon which the outer ends of these transversely extending springs are secured, lie in radii of a circle whose center lies in the same transverse line as the pivotal point of the ball joint 52. Consequently, it will be clear that the spring leaves lie in radial planes radiating from this transverse line through the pivotal points of the radius rods 46. This feature is regarded as extremely important in the motor mounting of the present invention.

It will further be noted that the framework 60 which serves to support the transverse central portion of the springs provides a mounting for the central portion of these springs such that the leaves are disposed in planes radiating from the axis of pivotal movement of the radius rods 46. It will further be noted that one of the springs is located above the horizontal plane through these pivotal points and the other spring is located below this horizontal plane. It will therefore be appreciated that as the springs are flexed, their movement will be in planes substantially tangential to the arc through which the axle moves.

It has long been well appreciated that in spring constructions of the leaf type, in order to obtain maximum efficiency, it is essential that the flexure of the springs takes place in a definite, predetermined plane, and consequently it has been found necessary to incline these spring elements one to the other due to the fact that they are substantially spaced from one another and lie above and below the horizontal plane through the axis of the pivotal points of the radius rods.

These spring elements serve to absorb shocks transmitted to the wheels and prevent these shocks from being transmitted to the framework in which the motor is mounted.

It has been found particularly desirable in a spring suspension arrangement of this type, to utilize shock struts or telescopic shock absorbers 70 extending downwardly and outwardly from the framework in which the motor is mounted to the wheel housings on which the outer ends of the springs and also on which the radius rods are connected. The combination of these vertically spaced slanted springs, together with the inclined shock absorbers, has been found to be particularly satisfactory for providing independent suspension for driven wheels such as necessary in the construction disclosed herein.

From the construction described above, it will be appreciated that the wheels, radius rods, motor framework, motor, transmission and differential, together with the resilient interconnection between the wheels and the motor, constitute a unit which is entirely independent of the body. Means are provided for demountably connecting this unit to the body in order to effect a definite driving connection therebetween. A pair of diagonally extending supporting members of generally channel configuration 80 are disposed at the rear end of the body and permanently secured to the body framework 10. These channel members serve to provide means for connecting the body proper directly to the motor unit. A pair of upwardly extending bolts 81 are provided at either side of the motor framework 25 which are adapted to register with suitable apertures in the inward ends of the channel members 80 and these channel members 80 may be secured directly to the motor framework by means of suitable nuts 82. It will be seen that these channel members serve to provide a positive support for the rear end of the vehicle body upon the motor framework which is disposed directly over the springs and consequently substantially in the region of the rear wheels. The rear portion of the framework 25 together with the wing portions 50 which mount the forward ends of the radius rods 46, generally mate with corresponding complementary framework members formed in the vehicle body and this forward end of the motor may be directly secured to the vehicle body by means of a suitable series of bolts 85 extending through the framework 25 and the framework 10.

From the foregoing it will be appreciated that the manner in which this motor and driving unit is secured into the vehicle body is extremely simple and that after such securement, the resulting connection is extremely rigid and provides means by which the motor may be permanently fixed in place with respect to the vehicle body. It will, of course, be readily appreciated that at the time the motor unit is disconnected the conventional connection to the gear shift mechanism, brake and various electrical and fuel connections will have to be made. However, demountable connections of this general type are so conventional in the art that it is not thought necessary for the purposes of the present invention to illustrate these in detail.

It will further be appreciated that the specific form of the invention disclosed in the drawings and described in the above specification is merely illustrative of one embodiment of the generic inventive concept defined in the subjoined claims. Many other and further modifications falling within the scope of the invention defined in the subjoined claims will be apparent to those skilled in the art.

I claim as my invention:

1. In a wheel mounting, a body frame, an axle, a radius rod pivoted to said frame and connected to said axle and limiting movement thereof within an arcuate path, a pair of superimposed transversely disposed leaf springs interconnecting said frame and axle, one of said springs being disposed above said axle and the other below, the leaves of said springs lying in planes passing through the pivotal axis of said radius rods.

2. A driving unit adapted for removable mounting with respect to an automobile body comprising a framework, axle housings spaced laterally on opposite sides of said framework, radius rods pivotally mounted in said framework and secured to said axle housings to limit movement thereof in an arcuate path, a pair of transversely extending spaced leaf springs secured in their central portions to said framework and having their ends secured to said axle housings substantially above and substantially below the point of securement of said radius rods, the leaves of said springs normally lying in planes passing through the pivotal axis of said radius rods.

3. A removable driving unit for vehicles including a framework, a radius rod pivotally mounted in said framework, an axle housing secured to said radius rod, transversely extending leaf springs secured to said framework and secured to said housing at points substantially above and below the point of securement of said radius rod, the planes of flexure of said springs being inclined to each other and lying substantially tangential to the arc of movement of said axle housing.

4. A driving unit adapted for removable mounting with respect to an automobile body comprising, a framework having integral wing portions at its forward end, axle housings spaced laterally on opposite sides of said framework, radius rods integral at one end with said axle housings and pivotally mounted at their other ends to the integral wing portions of said framework to limit movement of the axle housings in an arcuate path, and a plurality of leaf springs extending transversely of said framework and attached at their central portions to the framework and at their end portions to the axle housings, said springs lying in planes passing through the pivotal axis of said radius rods.

5. A driving unit adapted for removable mounting with respect to an automobile body comprising, a framework having an integral wing portion at its forward end, axle housings spaced laterally on opposite sides of said framework, a radius rod integral at one end with one of said axle housings and terminating in a ball at its other end, a separable socket for the ball end of said radius rod disposed on said wing portion to pivotally mount the radius rod on the framework, and a plurality of leaf springs extending transversely of said framework and attached at their central portions to the framework and at their end portions to the axle housings, said springs lying in planes passing through the pivotal axis of said radius rod.

WILLIAM B. STOUT.